(12) United States Patent  
Hay (10) Patent No.: US 8,833,472 B2  
(45) Date of Patent: Sep. 16, 2014

(54) METHODS AND APPARATUS FOR TRANSMISSION OF TELEMETRY DATA

(75) Inventor: Richard T. Hay, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/112,988

(22) PCT Filed: Apr. 10, 2012

(86) PCT No.: PCT/US2012/032873  
§ 371 (c)(1),  
(2), (4) Date: Oct. 21, 2013

(87) PCT Pub. No.: WO2013/154535  
PCT Pub. Date: Oct. 17, 2013

(65) Prior Publication Data  
US 2014/0055279 A1    Feb. 27, 2014

(51) Int. Cl.
| | |
|---|---|
| E21B 19/16 | (2006.01) |
| E21B 47/12 | (2012.01) |
| E21B 17/00 | (2006.01) |
| G01V 11/00 | (2006.01) |
| E21B 17/02 | (2006.01) |

(52) U.S. Cl.  
CPC .............. *E21B 47/124* (2013.01); *E21B 17/003* (2013.01); *E21B 47/122* (2013.01); *G01V 11/002* (2013.01); *E21B 17/028* (2013.01)  
USPC ........ 166/380; 166/242.6; 175/40; 340/854.4

(58) Field of Classification Search  
CPC ... E21B 47/122; E21B 47/124; E21B 17/028; E21B 17/003; G01V 11/002  
USPC ................. 340/854.4, 854.6, 853.7; 166/380, 166/242.6; 175/40  
See application file for complete search history.

(56) References Cited

U.S. PATENT DOCUMENTS

| | | |
|---|---|---|
| 4,087,781 A | 5/1978 | Grossi et al. |
| 4,578,675 A | 3/1986 | MacLeod et al. |

(Continued)

FOREIGN PATENT DOCUMENTS

| | | |
|---|---|---|
| EP | 1367216 A2 | 12/2003 |
| WO | 2010/137986 A2 | 12/2010 |

OTHER PUBLICATIONS

International Search Report and Written Opinion, International Application No. PCT/US2012/032873, 12 pgs., Jan. 30, 2013.

*Primary Examiner* — Yong-Suk (Philip) Ro  
(74) *Attorney, Agent, or Firm* — Jennifer M. Trillsch; Baker Botts L.L.P.

(57) ABSTRACT

A system for signal transmission along a drill string is disclosed. A first drill pipe section and a second drill pipe section each comprise an inner pipe. A first repeater sub is coupled to the first drill pipe section and the second drill pipe section at a first position along the drill string. The first repeater sub comprises a first toroid corresponding to the first drill pipe section and a second toroid corresponding to the second drill pipe section. A signal transmitted through the first drill pipe section, an inner mandrel of the repeater sub and the inner pipe of the first drill pipe section is received by the first toroid. The first repeater sub processes the signal received by the first toroid to generate a processed signal and transmits the processed signal to the second drill pipe through the second toroid.

23 Claims, 3 Drawing Sheets

(56) References Cited

U.S. PATENT DOCUMENTS

| | | |
|---|---|---|
| 6,218,959 B1 * | 4/2001 | Smith .................... 340/853.7 |
| 6,392,561 B1 | 5/2002 | Davies et al. |
| 6,830,467 B2 | 12/2004 | Hall et al. |
| 7,064,676 B2 | 6/2006 | Hall et al. |
| 7,084,782 B2 | 8/2006 | Davies et al. |
| 7,193,526 B2 | 3/2007 | Hall et al. |
| 7,224,288 B2 | 5/2007 | Hall et al. |
| 7,566,235 B2 | 7/2009 | Bottos et al. |
| 7,730,967 B2 | 6/2010 | Ballantyne et al. |
| 7,913,773 B2 | 3/2011 | Li et al. |
| 8,031,081 B2 | 10/2011 | Pisoni et al. |
| 2005/0001735 A1 | 1/2005 | Hall et al. |
| 2007/0107938 A1 | 5/2007 | Cornish et al. |
| 2010/0116550 A1 | 5/2010 | Hutin et al. |
| 2010/0224356 A1 | 9/2010 | Moore |
| 2011/0050452 A1 | 3/2011 | Kusuma et al. |

* cited by examiner

METHODS AND APPARATUS FOR TRANSMISSION OF TELEMETRY DATA

CROSS-REFERENCE TO RELATED APPLICATION

This application is a U.S. National Stage Application of International Application No. PCT/US2012/032873 filed Apr. 10, 2012, and which is hereby incorporated by reference in its entirety.

BACKGROUND

Hydrocarbons, such as oil and gas, are commonly obtained from subterranean formations. The development of subterranean operations and the processes involved in removing hydrocarbons from a subterranean formation are complex. Typically, subterranean operations involve a number of different steps such as, for example, drilling the wellbore at a desired well site, treating the wellbore to optimize production of hydrocarbons, and performing the necessary steps to produce and process the hydrocarbons from the subterranean formation.

It is desirable to obtain and monitor information pertaining to performance of subterranean operations. For instance, it is desirable to obtain information regarding formation characteristics, operational and directional parameters and the various components used to perform the subterranean operations. This information may then be provided to an operator in real-time and may be used to optimize overall system performance and improve efficiency. For instance, the data may be used to determine the location and quality of hydrocarbon reserves; the data may be used to determine whether hydrocarbon reserves can be produced through the wellbore; the data may be used to optimize performance of various components utilized; and the data may be used for well control during drilling operations. To that end, various logging-while-drilling ("LWD") or measurement-while-drilling ("MWD") packages have been developed to acquire data downhole and transmit that data to a desirable location, for instance, an operator at the surface. Typically, data transmission to the surface (or other locations within the wellbore) is accomplished using a hard-wire connection (e.g., electrical lines, wireline or cable), through acoustic or seismic signals, or by transmission of electromagnetic signals through the formation.

While a hard-wire connection may permit data transmission at a relatively high speed, such systems have various disadvantages. First, these systems require attachment of a hard-wire connector to the drill string, which subjects the connectors to wear (especially at the point of connection between sections of the drill pipe) and may prove costly. Moreover, the other equipment and methods commonly used when performing subterranean operations may have to be modified to accommodate these hard-wire connectors. Similarly, typical acoustic and seismic data transmission systems and the electromagnetic transmission of data through the formation have a number of disadvantages. For instance, a large amount of power is typically required in order to generate a signal that can be detected at the surface. Moreover, signal attenuation and noise adversely impact the transmission of electromagnetic signals through the formation. Additionally, typical data transmission systems are not well suited to facilitate downhole addition or interpretation of the data being transmitted between two different axial positions in the wellbore. Accordingly, it is desirable to develop an efficient mechanism to reliably transmit data between different axial positions within the wellbore.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and are not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The terms "couple" or "couples" as used herein are intended to mean either an indirect or a direct connection. Thus, if a first device couples to a second device, that connection may be through a direct connection, or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in a tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline, MWD and LWD operations.

The present application is directed to methods and systems for facilitating signal transmission when performing subterranean operations, and more particularly, to methods and systems for wireless signal transmission between different axial positions in a drill string.

Figures 1, 2:
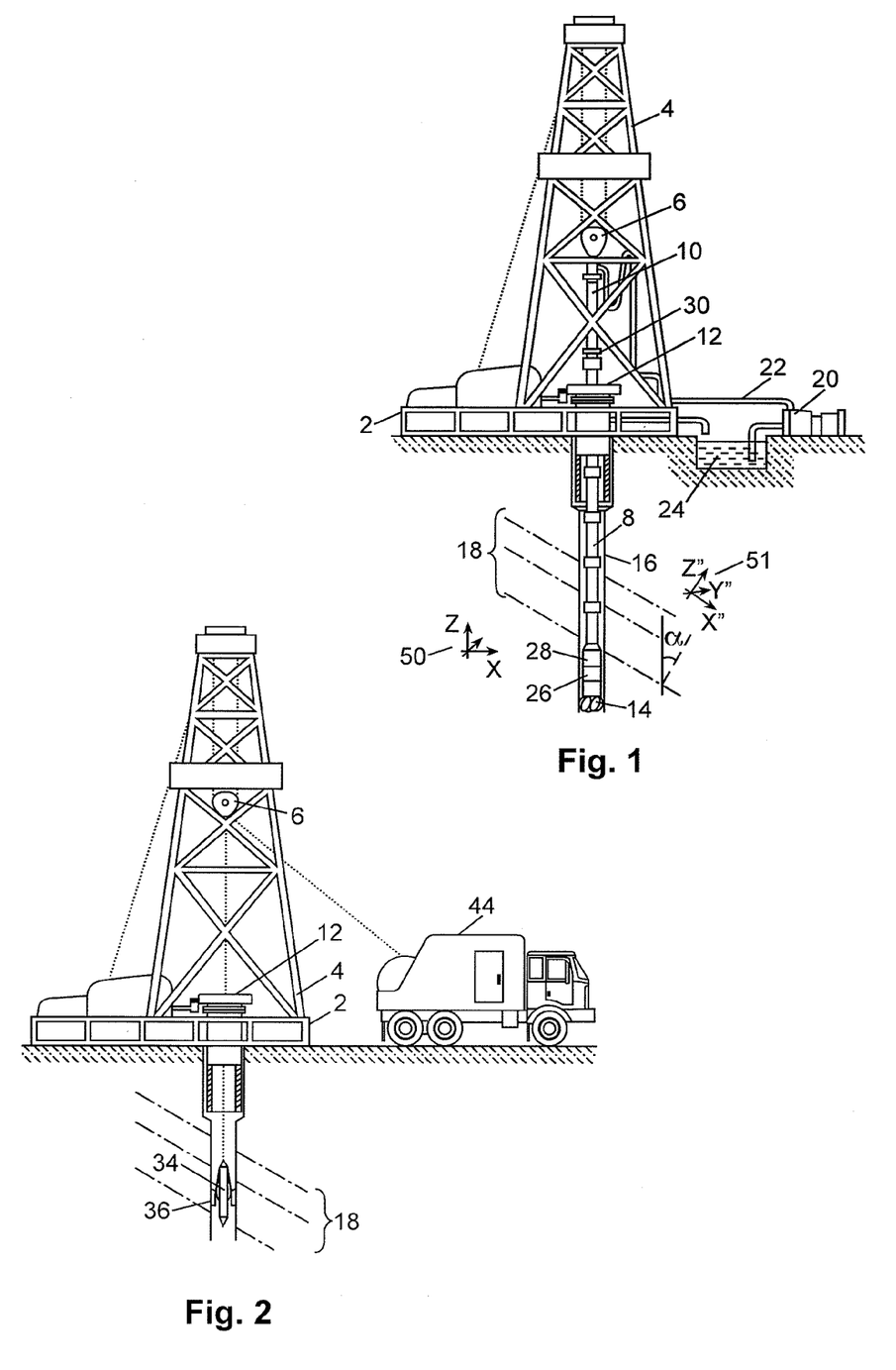
FIG. 1 shows an illustrative logging while drilling or measurement while drilling environment.
FIG. 2 shows an illustrative wireline logging environment.

Turning now to FIG. 1, oil well drilling equipment used in an illustrative LWD environment is shown. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

A logging tool 26 may be integrated into the bottom-hole assembly near the bit 14. The logging tool 26 may include receivers and transmitters. In one embodiment, the logging tool 26 may include a transceiver array that functions as both a transmitter and a receiver. As the bit extends the borehole through the formation, logging tool 26 may collect measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used in some embodiments. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver 30.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable having conductors for transporting power to the tool and telemetry from the tool to the surface. A logging facility 44 may collect measurements from the logging tool 34, and may include computing facilities for processing and storing the measurements gathered by the logging tool.

As shown in FIGS. 1 and 2, when performing drilling operations, a drill string may be inserted down hole through the well bore. Typically, the drill string may be comprised of a plurality of sections that may be detachably coupled to each other with other components (or "subs") placed therebetween at desirable locations to perform specific functions.

Figure 3:
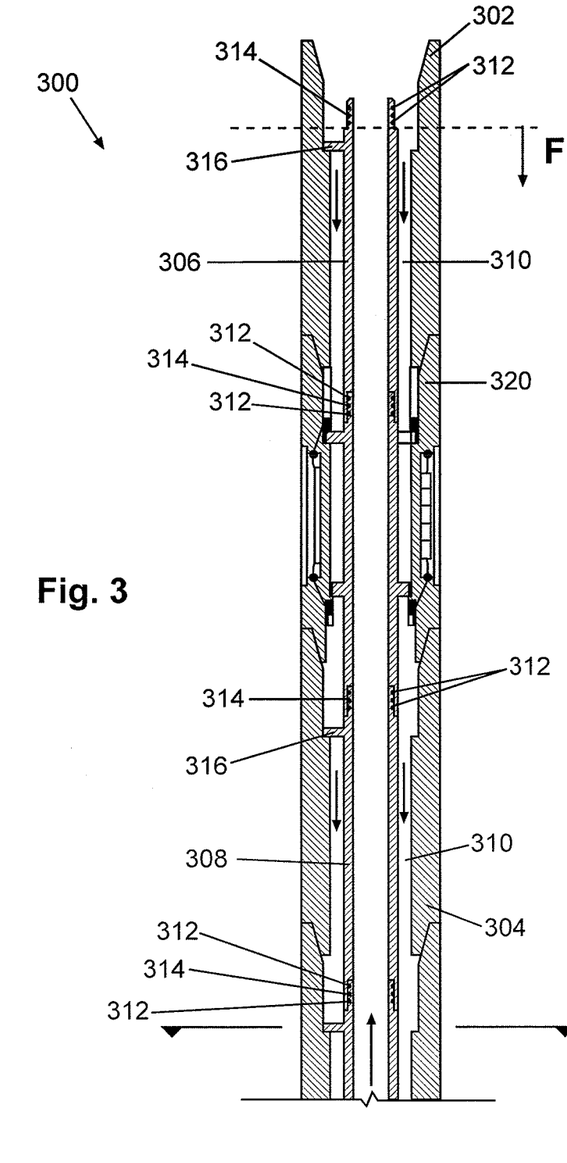
FIG. 3 shows an improved signal transmission system in accordance with an embodiment of the present disclosure.

Turning now to FIG. 3, an improved signal transmission system in accordance with an embodiment of the present disclosure is denoted generally with reference numeral 300. The drill string may be comprised of a first drill pipe 302 forming an upper portion of the drill string and a second drill pipe 304 forming a lower portion of the drill string. The drill string may further include a first inner pipe 306 and a second inner pipe 308 corresponding to the first drill pipe 302 and the second drill pipe 304, respectively.

Figure 3A:
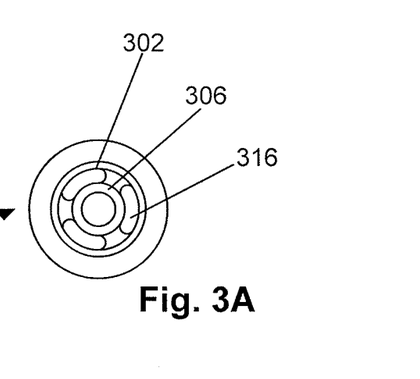
FIG. 3A shows a cross-sectional view of the improved signal transmission system of FIG. 3.

When performing drilling operations, a drilling fluid or drilling mud may be directed downhole through the annulus 310 between the drill pipe sections (302, 304) and the inner pipe sections (306, 308). The drilling fluid or mud is a specially designed fluid that is circulated in a wellbore or borehole as the wellbore is being drilled in a subterranean formation to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation. The drilling fluid may then be returned to the surface through the inner pipe sections (306, 308) as shown in FIG. 3. As would be appreciated by those of ordinary skill in the art, with the benefit of this disclosure, in another embodiment (not shown), the drilling fluid may be directed downhole through the inner pipe sections (306, 308) and may be returned to the surface through the annulus 310. Seals (e.g., O-rings) 312 and contact springs 314 may be provided at the interface of the different sections of the inner pipes (306, 308) to sealingly couple the inner pipe sections. The inner pipe sections (306, 308) may further include a hang off ring 316 that interfaces with the drill pipe sections (302, 304) and rests on a shoulder thereon as shown in FIG. 3. The hang off ring 316 may be insulated as discussed in more detail below. FIG. 3A depicts a cross-sectional view of the drill pipe of FIG. 3 including the drill pipe 302, the inner pipe 306 and the hang off ring 316.

FIG. 3 depicts a repeater sub 320 positioned between the first drill pipe 302 and the second drill pipe 304. Although a single repeater sub 320 is shown in FIG. 3, the drill string may include one or more repeater subs located at different locations along the wellbore axis between the drill pipe sections. Specifically, a plurality of repeater subs 320 may be positioned at different locations along the drill string. Accordingly, the plurality of repeater subs 320 may create multiple signal loops as discussed in more detail below. Each repeater sub 320 may be one of the uniquely addressable nodes in a repeater sub communication network that may be accessed by an information handling system. Specifically, the repeater subs 320 may be communicatively coupled to the information handling system using the methods and systems disclosed herein. The information handling system may be provided at a surface location and provide a user interface to access and manipulate the repeater subs 320. In certain embodiments, the information handling system may also be communicatively coupled to a Bottom Hole Assembly ("BHA") making the BHA one of the addressable nodes in the repeater sub communication network. The information handling system may then be operable to monitor and/or manipulate the operations of the BHA. Accordingly, each of the repeater sub(s) 320, the BHA and the information handling system form one of the addressable nodes in the repeater sub communication network which facilitates communication between the different nodes. Specifically, instructions and/or data may be transferred between the different nodes of the repeater sub communication network. In certain embodiments, the source of data from the various locations may be trackable to permit identification, processing, and recording of the data from the different nodes by the information handling system.

Figure 4:
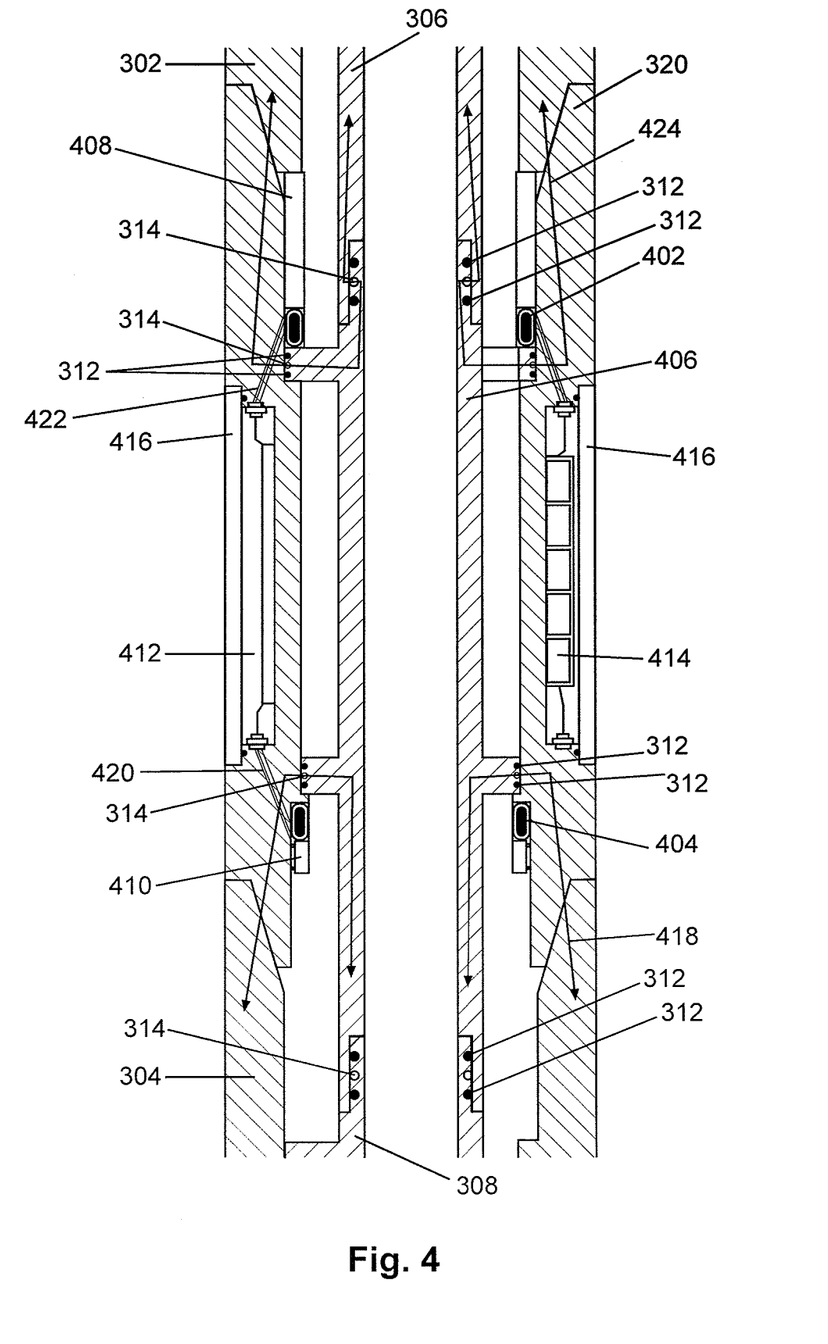
FIG. 4 shows a magnified view of the repeater sub of the improved signal transmission system of FIG. 3.

The operation of the repeater sub 320 will now be discussed in further detail in conjunction with FIG. 4. The repeater sub 320 may include an upper toroid 402 and a lower toroid 404 that facilitate the transmission of signals. The signals transmitted using the methods and systems disclosed herein may include data signals, power signals, or a combination thereof.

The toroids (402, 404) may be coupled to the repeater sub 320 body which is in turn coupled to the first drill pipe 302 and the second drill pipe 304. In one embodiment, the toroids (402, 404) are coupled to the repeater sub 320 such that they can rotate with the drill string as the drill string rotates. The repeater sub 320 may further include an inner mandrel 406 that is coupled to the inner pipes (306, 308). As discussed above with respect to FIG. 3, seals (e.g., O-rings) 312 and contact springs 314 may be used at the point of interface between the inner mandrel 406 and the inner pipes (306, 308) in order to provide a sealed interface between these components. In one embodiment, the inner mandrel 406 is coupled to the inner pipes (306, 308) such that it can rotate with the inner pipes (306, 308) as the drill string rotates. In one embodiment, a retention spacer 408 may be positioned between the first drill pipe 302 and the upper toroid 402 of the repeater sub 320. The retention spacer 408 is a non-limiting means of securing the upper toroid 402 in place. Specifically, the pin of the first drill pipe 302 and the retention spacer 408 may hold the upper toroid 402 in position in the repeater sub 320. In certain embodiments, a retention nut 410 may be used to support the lower toroid 404. Although a retention nut 410 and a retention spacer 408 are depicted in FIG. 4, the toroids 402, 404 may be retained at a desired position using one or a combination of other methods including, but not limited to, press fitting the toroids in place, gluing the toroids in place, or welding the toroids in place.

The repeater sub 320 may further include a compartment which may enclose the electronic circuitry 412 and batteries 414 associated with the repeater sub 320. Although batteries 414 are depicted as the power supply in the embodiment of FIGS. 3 and 4, other means may be used to provide the requisite power to the system. For instance, in certain embodiments, power may be supplied from a local generator using the mud flow. In one embodiment, the "clean" mud flowing between the drill pipe sections (302, 304) and the inner pipe sections (306, 308) may be used to generate power. The power generated by the power supply may then be transmitted to the electronic circuitry 412 through the connectors 420 and/or 422. As would be appreciated by those of ordinary skill in the art, with the benefit of this disclosure, in one embodiment, the data signals may be transmitted simultaneously with the power signal with the data signal imposed on top of an AC power signal. In other embodiments, a separate electrical connection may be used to deliver power to the repeater sub 320. As would be appreciated by those of ordinary skill in the art, with the benefit of this disclosure, the electronic circuitry 412 and the batteries 414 may be provided in the same compartment or in different compartments without departing from the scope of the present disclosure. In one embodiment, a hatch cover 416 may be provided over the compartment in which the electronic circuitry 412 and the batteries 414 are located. The hatch cover 416 may protect these components from wear and exposure to ensure proper operation of the system and minimize the costs associated with repair or replacement.

The operation of the repeater sub 320 for transmission of a signal between a first axial location and a second axial location along the drill string will now be discussed in conjunction with signal transmission from the lower drill pipe section 304 to the upper drill pipe section 302. As discussed below, the repeater sub 320 provides a bidirectional signal transmission system and permits communication of information from the upper drill pipe section 302 to the lower drill pipe section 304 in a similar manner.

The repeater sub 320 provides two separate current loops that facilitate signal transmission. In one embodiment, the drill pipe sections (302, 304), the inner pipe sections (306, 308) and the inner mandrel 406 may be coated with insulative materials to prevent current flow through a surface thereof. As would be appreciated by those of ordinary skill in the art, any suitable material that provides the requisite degree of insulation may be used as coating. In one embodiment, a ceramic such as those available from Saturn Ceramic Company of Sterling Heights, Mich. may be used as the insulative coating. In certain embodiments, other suitable materials including, but not limited to, plasma spray or liquid applied coatings providing electrically insulative properties and abrasion resistance; Gore high strength toughened fluoropolymer; Arlon 1000 also known as PEEK; nylon; and/or TEFLON™ may be used as coating material. Accordingly, the contact springs 314 provide the only current flow path between the inner pipe sections (306, 308) and the inner mandrel 406 as well as between the inner mandrel 406 and the drill pipe sections (302, 304).

A power signal and/or a signal carrying data may be transmitted along the drill string to the second drill pipe 304. At this point, a lower current loop 418 is developed which comes up the second inner pipe 308, through the contact spring 314 and then back down the second drill pipe 304. This current loop carries the signal that needs to be transmitted up through the drill string. The lower current loop 418 together with the lower toroid 404 form the primary winding of a virtual transformer positioned along the drill string. Accordingly, the lower toroid 402 can both detect and generate the signal embedded in the electrical signal in the lower current loop 418.

The signal detected by the lower toroid 404 based on the lower current loop 418 may then be directed to the electronic circuitry 412 through the lower connector 420. The electronic circuitry 412 may then manipulate the current signal received in various ways. In one embodiment, the electronic circuitry 412 may include an information handling system including a processor (not shown). The electronic circuitry 412 may decode the signal received from the lower toroid 404 and then re-encode and amplify the signal before directing it to an upper connector 422.

In certain embodiments, the repeater sub 320 may itself include one or more local sensors that monitor one or more parameters such as operational characteristics or formation properties in a region at or proximate to the repeater sub 320. As would be appreciated by those of ordinary skill in the art, with the benefit of this disclosure, the repeater sub 320 processor may be communicatively coupled to the local sensors through a local communication channel to facilitate transmission of data from the local sensors to the electronic circuitry 312. The repeater sub 320 may also include computer readable media that store readings from the local sensors. In these embodiments, the electronic circuitry 412 may add the information from the local sensors to the signal received before transmitting that signal up through the drill string. Typical add-in data may include, but is not limited to, one or a combination of local annulus pressure, inter-annulus pressure between the pipes and inner pipe, thrust force, torque force, bend force, flow rates, vibration/acceleration, seismic data, local mud properties (e.g., temperature, viscosity, salinity content, solids content), formation properties (e.g., resistivity, fluid invasion profiles, gamma ray), acoustically sensed properties (e.g., formation fluid shear, density, porosity, hole diameter), and any other desirable measurements. In certain embodiments, the data obtained from the local sensors by the electronic circuitry 412 may be transmitted to another location along the drill string, such as, for example, another repeater sub 320, the BHA, and/or an information handling system at the surface. The obtained data may then be processed and/or monitored to optimize overall system performance. In accordance with certain embodiments, before the obtained data is transmitted from a repeater sub 320, it may be tagged with an identification flag to indicate the particular repeater sub 320 in the repeater sub communication network where the particular data was collected. Accordingly, it would be possible to identify the specific repeater sub along the drill string where a particular set of data was collected. As would be appreciated by those of ordinary skill in the art, with the benefit of this disclosure, that information may then be used to monitor the performance of subterranean operations.

Once the electronic circuitry 412 has performed the requisite signal processing functions discussed above, the signal from the electronic circuitry 412 may be transmitted to an upper current loop 424. In a manner similar to the lower current loop 418, the upper current loop 424 goes up the inner pipe section 306, through the contact spring 314 and then back up the first drill pipe 302, as shown in FIG. 4. This upper current loop 424 may contain a signal that needs to be transmitted to a different axial position of the drill string located uphole or directly to the surface. The upper current loop 424 together with the upper toroid 402 form the secondary winding of the virtual transformer positioned along the drill string. Accordingly, as would be appreciated by those of ordinary skill in the art, with the benefit of this disclosure, the upper toroid 402 can both detect and generate the signal embedded in the electrical signal that it receives from the upper connector 422. The upper current loop 424 will thus receive the signal processed by the repeater sub 320 and transmit it up through the drill string to the surface or to a subsequent repeater sub.

As would be appreciated by those of ordinary skill in the art, with the benefit of this disclosure, a similar, but reversed process may be used to transmit signals (i.e., data signals, power signals, or a combination thereof) down through the repeater sub 320 in a direction from the first drill pipe 302 to the second drill pipe 304. Specifically, when transmitting a signal down through the drill string, the upper current loop 424 brings the signal to the repeater sub 320. Once the electronic circuitry 412 of the repeater sub 320 processes the signal as discussed above, it will be directed to the lower current loop 418 through the lower connector 420 and is thus transmitted downhole through the drill string.

In certain embodiments, the repeater sub 320 electronic circuitry 412 may be equipped with band pass filters to facilitate signal transmission along a plurality of channels over an available signal transmission spectrum. As would be appreciated by those of ordinary skill in the art, with the benefit of this disclosure, the various components of the repeater sub 320 (e.g., toroids, inner mandrel, etc.) may be detachably coupled to the repeater sub 320 to facilitate easy removal thereof from the repeater sub 320. Accordingly, one or more components may be removed for repair, replacement or cleaning, when desirable.

Accordingly, the methods and systems disclosed herein may be used to communicate desirable information between any two axial positions along the drill string by forming an axial conducting loop. For instance, the first axial point may be a position downhole while the second axial point may be at the surface. Similarly, the methods and systems disclosed herein may be used to communicate information between a first axial point and a second axial point both of which are located downhole, at different locations along the drill string. Moreover, the methods and systems disclosed herein may provide a bidirectional signal transmission system permitting communication of information in a direction towards the surface or away from the surface of the wellbore in which the drill string is located.

As would be appreciated by those of ordinary skill in the art, with the benefit of this disclosure, the information communicated using the methods and systems disclosed herein may include information relating to a number of different operational and formation parameters that are of importance when performing subterranean operations. For instance, information communicated towards the surface may include, but is not limited to, information relating to the ongoing subterranean operations and may include, but is not limited to, weight-on-bit, natural gamma ray emissions, borehole inclination, borehole pressure, mud cake resistivity, etc. Information communicated away from the surface may be instructions to downhole components and may include, but is not limited to, signals from the surface prompting the system to send information back to the surface or instructions to alter the performance of the on-going subterranean operations such as altering drilling operations where a downhole motor drill assembly is utilized.

Although the methods and systems disclosed herein are described in conjunction with performance of drilling operations and utilization of a drill string, as would be appreciated by those of ordinary skill in the art, the same methods and systems are applicable to other aspects of performance of subterranean operations without departing from the scope of the present disclosure.

The present invention is therefore well-adapted to carry out the objects and attain the ends mentioned, as well as those that are inherent therein. While the invention has been depicted, described and is defined by references to examples of the invention, any such reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A system for signal transmission along a drill string comprising:
   a first drill pipe section;
   a first inner pipe corresponding to the first drill pipe section;
   a second drill pipe section;
   a second inner pipe corresponding to the second drill pipe section;
   a first repeater sub coupled to the first drill pipe section and the second drill pipe section at a first position along the drill string, the first repeater sub comprising an inner mandrel;
   a first contact, wherein the first contact provides a first current flow path between the first drill pipe section and the inner mandrel;
   a second contact, wherein the second contact provides a second current flow path between the first inner pipe and the inner mandrel;
   a third contact, wherein the third contact provides a third current flow path between the second drill pipe section and the inner mandrel; and
   a fourth contact, wherein the fourth contact provides a fourth current flow path between the second inner pipe and the inner mandrel;
      wherein the first repeater sub comprises a first toroid corresponding to the first drill pipe section and a second toroid corresponding to the second drill pipe section;
      wherein a signal transmitted through the first drill pipe section is received by the first toroid;
      wherein the first repeater sub processes the signal received by the first toroid to generate a processed signal; and
      wherein the first repeater sub transmits the processed signal to the second drill pipe through the second toroid.

2. The system of claim 1, wherein the signal is selected from a group consisting of a power signal, a data signal, and a combination thereof.

3. The system of claim 1, wherein the first repeater sub further comprises electronic circuitry, wherein the electronic circuitry processes a signal received by the first toroid.

4. The system of claim 3, wherein the electronic circuitry comprises an information handling system.

5. The system of claim 1, wherein the first drill pipe section and the first toroid are positioned downhole relative to the second drill pipe section and the second toroid.

6. The system of claim 1, wherein the first drill pipe section and the first toroid are positioned uphole relative to the second drill pipe section and the second toroid.

7. The system of claim 1, further comprising a local sensor coupled to the first repeater sub, wherein the local sensor collects data relating to one or more parameters at a location proximate to the first repeater sub.

8. The system of claim 7, further comprising a second repeater sub placed at a second position along the drill string, wherein the first repeater sub transmits the one or more parameters from the local sensor to at least one of the second repeater sub, a bottom hole assembly and an information handling system at a surface location.

9. The system of claim 7, wherein the first repeater sub tags the data collected relating to the one or more parameters at the location proximate to the first repeater sub with an identification flag, wherein the identification flag indicates that the data was collected at the location proximate to the first repeater sub.

10. The system of claim 1, further comprising a third repeater sub placed at a third position along the drill string and a repeater sub communication network, wherein the repeater sub communication network at least one of communicatively couples the first repeater sub and the third repeater sub and communicatively couples the first repeater sub and an information handling system at a surface location.

11. The system of claim 10, further comprising a bottom hole assembly, wherein the repeater sub communication network at least one of communicatively couples the first repeater sub and the bottom hole assembly and communicatively couples the information handling system and the bottom hole assembly.

12. A method for transmitting a signal along a pipe comprising:
   inserting the pipe in a wellbore;
      wherein the pipe comprises a first pipe section and a corresponding first inner pipe section coupled to a repeater sub and a second pipe section and a corresponding second inner pipe section coupled to the repeater sub;
      wherein the repeater sub comprises an inner mandrel;
   providing a first current flow path between the first pipe section and the inner mandrel;
   providing a second current flow path between the first inner pipe section and the inner mandrel;
   providing a third current flow path between the second pipe section and the inner mandrel;
   providing a fourth current flow path between the second inner pipe section and the inner mandrel;
   transmitting a signal to an interface of the first pipe section and the repeater sub, wherein the signal develops a first current loop through the first pipe section, the first inner pipe section and the inner mandrel, wherein the first current loop is directed through the first current flow path and the second current flow path;
   receiving the signal at a first toroid positioned at an interface of the first pipe section and the repeater sub;
   processing the signal at the repeater sub;
   directing the processed signal to a second toroid positioned at an interface of the second pipe section and the repeater sub;
   transmitting the processed signal to the second pipe section from the second toroid, wherein the processed signal develops a second current loop through the second pipe section, the second inner pipe section and the inner mandrel, wherein the second current loop is directed through the third current flow path and the fourth current flow path.

13. The method of claim 12, further comprising flowing a drilling fluid through an annulus formed between the first pipe section and the first inner pipe, an annulus formed between the repeater sub and the inner mandrel, and an annulus formed between the second pipe section and the second inner pipe.

14. The method of claim 12, further comprising transmitting power to the repeater sub.

15. The method of claim 12, wherein the signal is selected from a group consisting of a power signal, a data signal, and a combination thereof.

16. The method of claim 15, wherein processing the signal at the repeater sub comprises one or more of amplifying the signal and adding information to the data signal.

17. The method of claim 16, wherein the information added to the data signal is selected from a group consisting of local annulus pressure, inter-annulus pressure, thrust force, torque force, bend force, flow rates, vibration, acceleration, seismic data, local mud properties, formation properties, acoustically sensed properties, and a combination thereof.

18. The method of claim 12, wherein the first drill pipe section is located downhole relative to the second drill pipe section.

19. A method of transmitting a signal along a drill string having a first drill pipe with a corresponding first inner pipe and a second drill pipe with a corresponding second inner pipe, the method comprising:
    coupling the first drill pipe and the first inner pipe to a repeater sub having an inner mandrel;
    coupling the second drill pipe and the second inner pipe to the repeater sub;
    providing a first current flow path between the first drill pipe and the inner mandrel;
    providing a second current flow path between the first inner pipe and the inner mandrel;
    providing a third current flow path between the second drill pipe and the inner mandrel;
    providing a fourth current flow path between the second inner pipe and the inner mandrel;
    transmitting the signal to a primary binding of a virtual transformer;
    wherein the primary binding of the virtual transformer comprises a first toroid and a first current loop positioned at a first axial position along the drill string;
    wherein the first current loop flows through the first drill pipe, the inner mandrel of the repeater sub, and the first inner pipe corresponding to the first drill pipe;
    wherein the first current loop flows through the first current flow path and the second current flow path;
    directing the signal to a secondary binding of the virtual transformer;
    wherein the secondary binding of the virtual transformer comprises a second toroid and a second current loop positioned at a second axial position along the drill string;
    wherein the second current loop flows through the second drill pipe, the inner mandrel of the repeater sub, and the second inner pipe corresponding to the second drill pipe;
    wherein the second current loop flows through the third current flow path and the fourth current flow path; and
    transmitting the signal from the secondary binding of the virtual transformer to a third axial position along the drill string.

20. The method of claim 19, wherein the signal is selected from a group consisting of a data signal, a power signal, or a combination thereof.

21. The method of claim 19, wherein directing the signal to the secondary binding of the virtual transformer further comprises processing the signal.

22. The method of claim 21, wherein processing the signal comprises one or more of amplifying the signal and adding information to the data signal.

23. The method of claim 22, wherein the information added to the data signal is selected from a group consisting of local annulus pressure, inter-annulus pressure, thrust force, torque force, bend force, flow rates, vibration, acceleration, seismic data, local mud properties, formation properties, acoustically sensed properties, and a combination thereof.

* * * * *